(12) United States Patent
Pappachan et al.

(10) Patent No.: US 11,496,314 B2
(45) Date of Patent: Nov. 8, 2022

(54) INTEGRITY PROTECTED COMMAND BUFFER EXECUTION

(71) Applicant: Intel Corporation, Santa Clara, CA (US)

(72) Inventors: Pradeep M. Pappachan, Tualatin, OR (US); Reshma Lal, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 93 days.

(21) Appl. No.: 16/718,460

(22) Filed: Dec. 18, 2019

(65) Prior Publication Data
US 2020/0127836 A1 Apr. 23, 2020

(51) Int. Cl.
| | |
|---|---|
| *H04L 9/32* | (2006.01) |
| *G06F 21/60* | (2013.01) |
| *H04L 9/08* | (2006.01) |

(52) U.S. Cl.
CPC .......... *H04L 9/3226* (2013.01); *G06F 21/602* (2013.01); *H04L 9/085* (2013.01)

(58) Field of Classification Search
CPC ...... H04L 9/3226; H04L 9/085; G06F 21/602
See application file for complete search history.

(56) References Cited

U.S. PATENT DOCUMENTS

| | | | | |
|---|---|---|---|---|
| 2003/0140241 A1* | 7/2003 | England | ................ | G06F 21/83 713/194 |
| 2005/0283602 A1* | 12/2005 | Vembu | ................ | G06F 12/109 713/150 |
| 2011/0296440 A1* | 12/2011 | Launch | ................ | G06F 21/72 719/326 |
| 2017/0024568 A1* | 1/2017 | Pappachan | ............ | G06F 21/64 |
| 2019/0129754 A1* | 5/2019 | McCrary | ............ | G06F 12/023 |
| 2019/0130120 A1* | 5/2019 | Lal | .................. | G06F 9/45558 |
| 2019/0132118 A1* | 5/2019 | Ghosh | ................ | H04L 9/083 |
| 2019/0180038 A1* | 6/2019 | Muppalla | .......... | G06T 7/0002 |
| 2019/0205244 A1* | 7/2019 | Smith | ................ | G06F 3/065 |
| 2019/0227951 A1* | 7/2019 | Durham | ............ | G06F 12/1027 |

FOREIGN PATENT DOCUMENTS

| | | |
|---|---|---|
| CN | 112989351 A | 6/2021 |
| DE | 102020127108 A1 | 6/2021 |

\* cited by examiner

*Primary Examiner* — Ali S Abyaneh
*Assistant Examiner* — Zoha Piyadehghibi Tafaghodi
(74) *Attorney, Agent, or Firm* — Jaffery Watson Mendonsa & Hamilton LLP (57) ABSTRACT

Embodiments are directed to providing integrity-protected command buffer execution. An embodiment of an apparatus includes a computer-readable memory comprising one or more command buffers and a processing device communicatively coupled to the computer-readable memory to read, from a command buffer of the computer-readable memory, a first command received from a host device, the first command executable by one or more processing elements on the processing device, the first command comprising an instruction and associated parameter data, compute a first authentication tag using a cryptographic key associated with the host device, the instruction and at least a portion of the parameter data, and authenticate the first command by comparing the first authentication tag with a second authentication tag computed by the host device and associated with the command.

23 Claims, 7 Drawing Sheets

INTEGRITY PROTECTED COMMAND BUFFER EXECUTION

TECHNICAL FIELD

Embodiments described herein generally relate to the field of data processing and, more particularly to integrity protected command buffer execution.

BACKGROUND

Graphics processing units (GPUs) are widely used to accelerate compute workloads. Trusted Execution Environments (TEEs) such as include Intel® Software Guard Extensions (SGX) can be used to protect the confidentiality and integrity of user data and compute kernels on a host computing device. In order to securely offload workloads to an accelerator device such as a graphics processing unit (GPU) or similar accelerator it is necessary to protect the integrity of data and kernels, and to protect the integrity of command buffers that are used to instruct the GPU to setup the execution environment of the compute kernel and launch the kernels. In some examples the command buffers contain commands that instruct the command processors in the GPU to setup the execution environment for the GPGPU kernels to execute inside the GPU. The compute kernels execute on the SIMD execution units. These command buffers can be constructed inside a host TEE by user space software, but the command buffers are submitted to the GPU by the kernel mode driver that is outside the TEE. The kernel mode driver performs functions such as auditing of commands and modification of virtual addresses in the commands before submitting them to the GPU. Therefore, command buffers may be vulnerable to unauthorized modification (i.e., insertion, deletion or modification of commands and their parameters) by a malicious software.

GPU command buffers are complex data structures residing in memory that typically consist of batches of commands chained together by pointers. Commands may contain inline data or reference external data via pointers. These commands are read, parsed and executed by a command processor (also called a command streamer) in the GPU. The reading and execution of commands in the command buffer is interleaved, i.e., the command buffer is not read into GPU memory in its entirety, but incrementally read and executed. Furthermore, command execution for one workload might be preempted by a higher priority workload and resumed later. All of the above present challenges to protecting the integrity of the command buffer in such a way so as to ensure that only integrity-verified commands and data are consumed by the GPU.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are directed to providing integrity protected command buffer execution. While principles and techniques are described in the context of a graphics processing unit (GPU) environment, it will be understood that the principles and techniques apply equally to other processing environments, e.g., to video processing environments and/or to artificial intelligence (AI) process such as neural network processing.

Example Computing Environment

Figure 1:
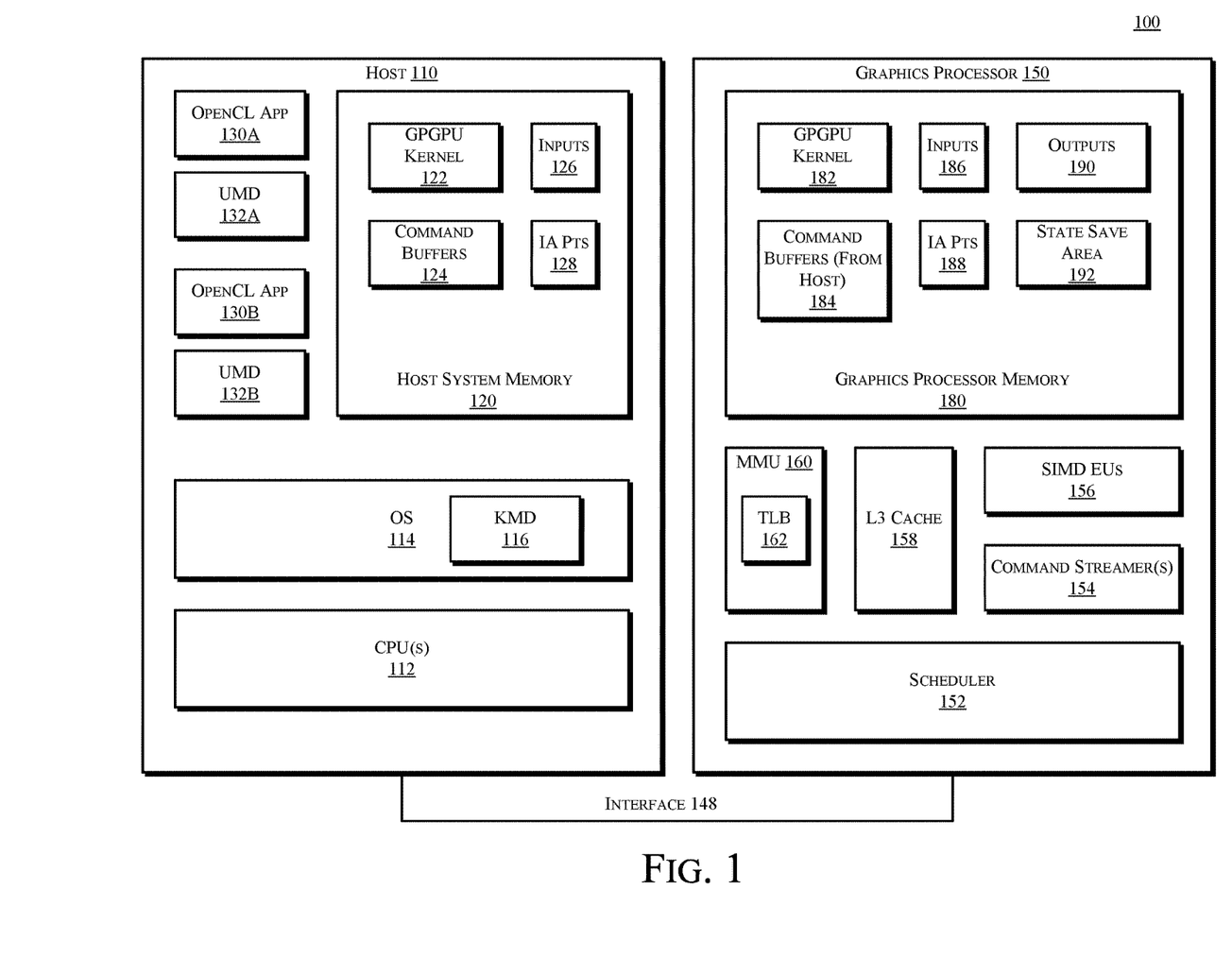
FIG. 1 is a block diagram illustrating a computing system architecture including a host system and associated graphics processor in accordance with an embodiment.

FIG. 1 is a block diagram illustrating a computing environment 100 comprising a host system 110 and associated graphics processor 150. The computing environment 100 may be embodied as any type of computing device capable of performing the functions described herein. For example, the computing environment 100 may be embodied as, without limitation, a computer, a laptop computer, a tablet computer, a notebook computer, a mobile computing device, a smartphone, a wearable computing device, a multiprocessor system, a server, a workstation, and/or a consumer electronic device.

In some examples host system 110 may comprise one or more central processing units (CPUs) 112 which execute an operating system 114. The one or more CPUs 112 may comprise any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit. In some embodiments, the CPU(s) 112 may be one or more processors in the Pentium® family of processors including the Pentium® II processor family, Pentium® III processors, Pentium® IV, CORE2 Duo processors, or Atom processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

Operating system 114 may be embodied as a UNIX operating system or any derivative thereof (e.g., Linux, Solaris, etc.) or as a Windows® brand operating system, or other operating systems. Operating system 114 may implement a kernel mode driver (KMD) to support devices and/or applications that execute on host system 110.

Host system 110 further comprises host system memory 120 which, in turn comprises a GPU compute kernel 122, one or more command buffers 124, a memory space for inputs 126 and host page tables 28. In some embodiments host system 110 may execute one or more OpenCL applications 130A, 130B that invoke an API such as the Open Computing Language (OpenCL) 132A, 132B, API from the Khronos Group. In some embodiments, support may also be provided for the Direct3D library from the Microsoft Corporation. In some embodiments, a combination of these libraries may be supported. Support may also be provided for the Open Source Computer Vision Library (OpenCV).

In some examples all or part of host 110 may be implemented in a trusted execution environment (TEE), also known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the CPU(s) 112 while being executed or while being stored in certain protected memory of the host 110. For example, the trusted execution environment (TEE) may be embodied as Intel® Software Guard Extensions (SGX) technology.

In some examples graphics processor 150 comprises a scheduler 152, a command streamer(s) 154, a plurality of single-instruction multiple data (SIMD) execution units (EUs), L3 cache 158, and a memory management unit (MMU) 160 which maintains a translation look-aside buffer (TLB) 162. Graphic processor 150 further comprises memory 180 which maintains a GPGPU kernel 182, one or more command buffers 184, one or more inputs 186, one or more graphics page tables 188, one or more outputs 190, and a graphics state save area 192.

In one embodiment the scheduler 152 schedules the user workloads (consisting of GPU compute kernel and input data) on available command streamers (154). The command streamers dispatch instances of the GPU compute kernel to the SIMD Execution Units for execution. In one embodiment the scheduler 152 is implemented via firmware logic executing on a microcontroller. The microcontroller implemented scheduler 152 is configurable to perform complex scheduling and work distribution operations at coarse and fine granularity, enabling rapid preemption and context switching of threads executing on the execution units 156. In one embodiment, software executing on the host 110 can prove workloads for scheduling on the execution units 156. The workloads can then be automatically distributed across the execution units 156 by the command streamer 154.

Scheduling operations implemented by scheduler 152 include determining which workload to execute and submitting a workload to a command streamer 154. In some embodiments, command streamer 154 is communicatively coupled with host and graphics memory. In some embodiments, command streamer 154 receives commands from the memory, interprets and executes them in order to setup the execution environment for the GPU compute kernels to execute on the SIMD EUs. In some examples the commands include directives fetched from a command buffer 184, which stores commands. In one embodiment described below, the command buffer 184 may comprise a ring buffer and one or more batch command buffers storing batches of multiple commands. The commands can also include references to data stored in memory, such as but not limited to vertex and geometry data for graphics operations.

Graphics processor 150 may include a memory management unit (MMU) 160 that is configured to map graphics virtual addresses into physical addresses. The MMU 160 includes a set of page tables used to map graphics virtual addresses to physical addresses of a tile and optionally a cache line index. The MMU 160 may include address translation lookaside buffers (TLB) 162 for caching translations of graphics virtual addresses to physical addresses.

In some examples host 110 and graphics processor 150 may reside on separate functional units which may be communicative coupled by a communication interface, i.e., a PCIe communication interconnect. In other examples host 110 and graphics processor 150 may be integrated onto a single processing device.

In operation, an application 130A, 130B executing on host 110 uses the API exposed by a framework such as OpenCL to specify the compute kernel and its inputs and how the kernel should be launched on the graphics processor. The user mode driver(s) (UMD) 132A, 132B translates this specification into commands intelligible to the GPU command streamer 154. The command buffers 124 containing the commands are created in host memory and submitted to the kernel mode driver (KMD) 116. The KMD 116 may audit these commands before sending a notification to the GPU scheduler 152 that the commands are ready for execution. The scheduler 152 selects a command streamer 154 to execute the commands. The selected command streamer 154 reads each command serially from memory, parses it and executes the command. Execution of a command might involve copying data from memory regions pointed to by the command into the GPU's local memory by a DMA engine in the GPU. Most of the commands in the buffer are used to set up the environment for the compute kernel to execute. Special "kernel launch" commands are used to finally dispatch the kernel to the SIMD execution units and perform the computation.

Command Buffers

Figure 2:
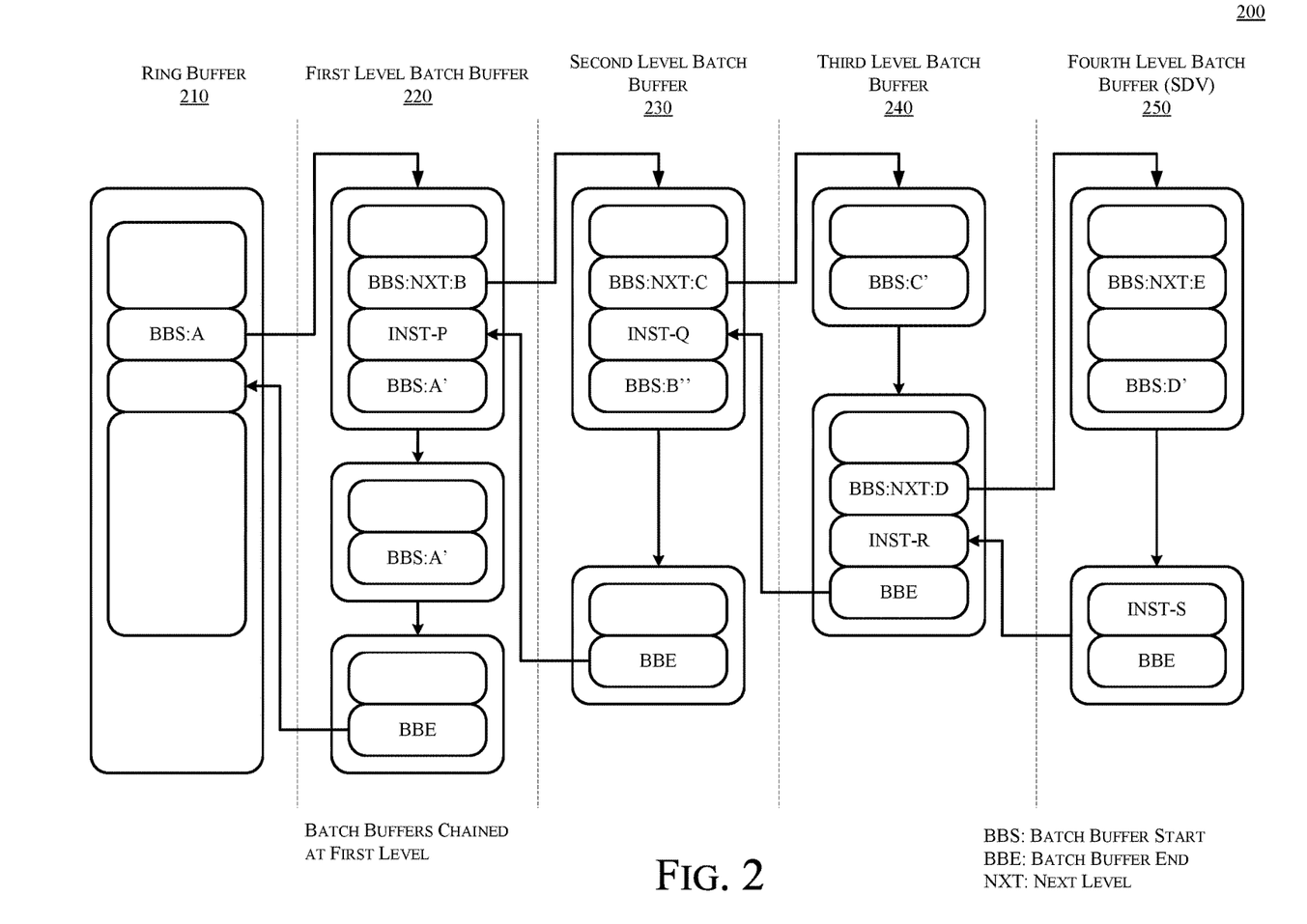
FIG. 2 is a block diagram illustrating the structure of command buffers in accordance with an embodiment.

FIG. 2 is a block diagram illustrating examples of command buffers 200 in accordance with an embodiment. As mentioned above, in some examples a command buffer 200 may comprise a ring buffer 210 which stores a command and one or more batch buffers 220, 230, 240, 250 which may store batches of multiple commands related to the command in the ring buffer 210. The commands in the command buffer are linked by pointers such that they can be executed in a sequential fashion.

Referring to FIG. 2, a command in ring buffer 210 may comprise a batch buffer start pointer (BBS:A) which points to the starting location in a first level batch buffer 220 for a command. Similarly, the command in the first level batch buffer 220 may comprise a batch buffer start pointer (BBS: NXT:B) which points to the starting location in a second level batch buffer 230. The command in the second level batch buffer 230 may comprise a batch buffer start pointer (BBS:NXT:C) which points to the starting location in a third level batch buffer 240. The command in the third level batch buffer 240 may comprise a batch buffer start pointer (BBS: NXT:D) which points to the starting location in a fourth level batch buffer 250.

The command in the fourth-level batch buffer 250 includes a batch buffer end (BBE) designator. When the last command in batch buffer i is completed, control is transferred to the command in the previous batch buffer (i-1) that follows the command that launched batch buffer i. Similarly, a command in the third level batch buffer 240 includes a batch buffer end pointer (BBE) designator, a command in the second level batch buffer 230 includes a batch buffer end pointer (BBE) designator, and a command in the first level batch buffer 220 includes a batch buffer end pointer (BBE) designator.

In some examples, the ring buffer 210 has two pointers: a tail pointer and a head pointer. Software on the CPU writes commands at the address pointed to by the tail pointer. The GPU command streamer consumes commands from the address pointed to by the head pointer. When the head and tail pointer addresses are the same, all the commands have been processed by the GPU.

In operation, the kernel mode drive (KMD) 116 writes commands into the ring buffer 210 at the location pointed to by the tail pointer. The graphics processor 150 consumes commands at the position pointed to by the head pointer then follows the pointers through the various levels of the command buffer 200. Command execution begins and ultimately ends in the top-level ring buffer. In some examples a workload may be preempted (e.g., by a higher priority workload) at the end of a batch buffer before the next set of commands is executed. In that case, the state of command execution is saved by the graphics processor 150 in the state save area (192) so that when the workload is resumed, it can continue execution of the batch buffer where it was interrupted.

Figure 3:
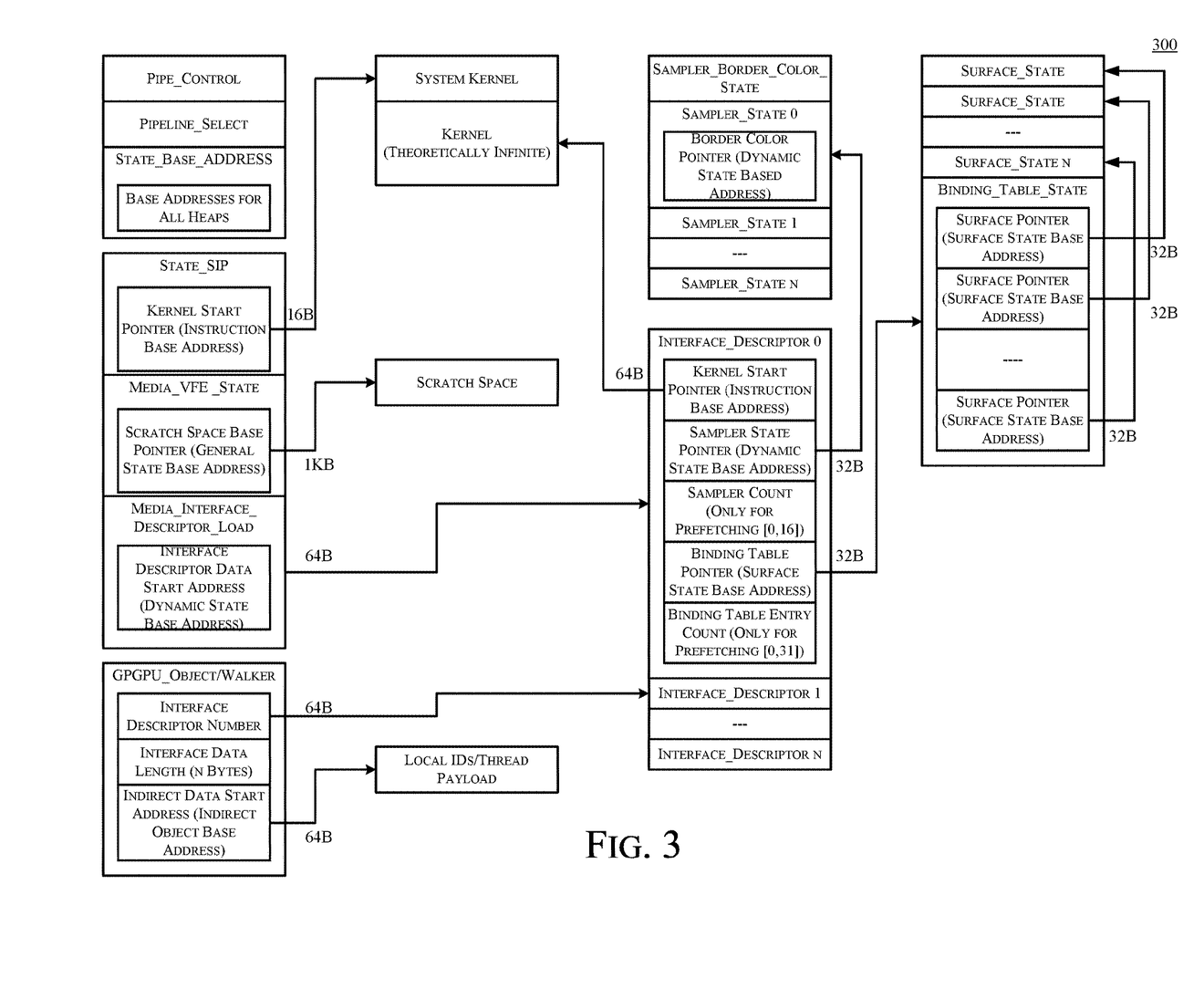
FIG. 3 is block diagram illustrating a concrete example of a command buffer structure in accordance with an embodiment.

FIG. 3 is block diagram illustrating a simple concrete example of a command buffer structure in accordance with an embodiment. In particular, FIG. 3 illustrates a small batch buffer 300 and its layout in memory. As illustrated in FIG. 3, some commands (e.g., preamble commands such as the PIPE_CONTROL, PIPELINE_SELECT, and STATE_BASE_ADDRESS command are self-contained (i.e., they contain all the parameters inline). These commands may be executed independently.

By contrast, other commands (e.g., kernel commands and dispatch commands) point to regions in memory that contain data buffers, descriptors, etc., that need to be read when the corresponding commands are executed. For example, the STATE_SIP command includes a kernel start pointer which points to the start address of the compute kernel. Similarly, the MEDIA_INTERFACE_DESCRIPTOR_LOAD command points to a data structure called the INTERFACE_DESCRIPTOR, which contains information about the kernel to be launched, such as the kernel start address. In some examples the interface descriptor may also include pointers to a BINDING_STATE_TABLE. When the command streamer 152 reads the MEDIA_INTERFACE_DESCRIPTOR_LOAD command, it follows the pointer address in the command to also read the interface descriptor and record its contents.

Thus, protecting the integrity of command buffers involves both verifying the integrity of a command and verifying the integrity of data stored in memory and referenced by the command (e.g., the interface descriptor for the MEDIA_INTERFACE_DESCRIPTOR_LOAD command).

Tag Record Arrays

Figure 4:
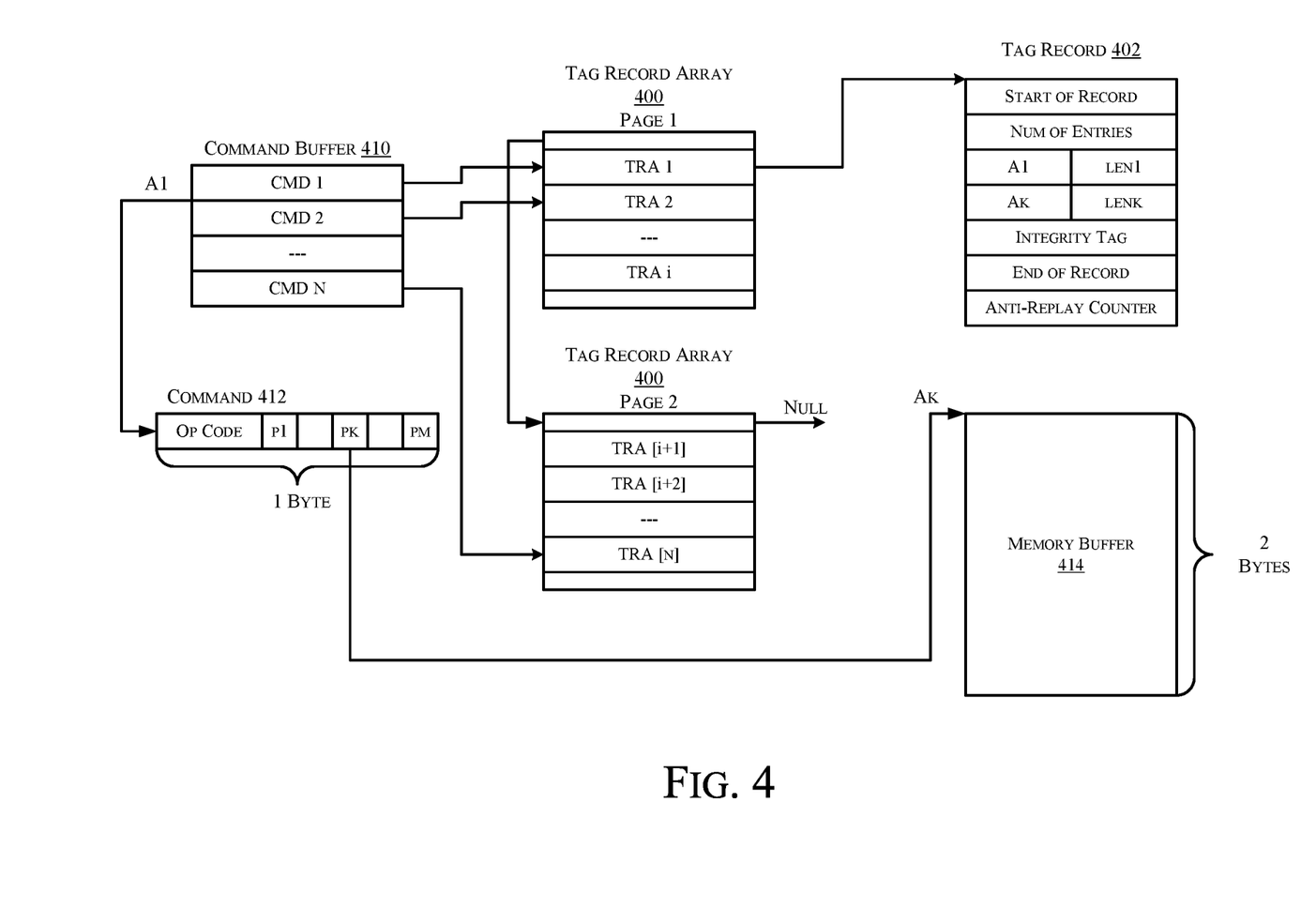
FIG. 4 is block diagram illustrating a tag record and tag record array data structures in accordance with an embodiment.

In one embodiment, a data structure referred to herein as a tag record array (TRA) may be implemented to facilitate providing integrity protected command buffer execution. FIG. 4 is block diagram illustrating a tag record array data structure 400 in accordance with an embodiment. Referring to FIG. 4, each command 412 in the command buffer 410 may be logically linked to an entry in a tag record array 400. In some examples the tag record array entries 402 may be computed for commands in the order that the commands are to be executed by the command processor (i.e., graphics processor 150). In the case of multiple chained command buffers, the tag records 402 stored in the tag record array 400 correspond to the order in which commands across all the chained buffers are executed.

In some examples the tag record array 400 may be stored in host memory by the producer of the command buffer, e.g., in a unified memory accessible by both the host 110 and the GPU 150. Since the tag record array 400 might span multiple non-contiguous pages in memory, each page containing tag record array elements starts with a pointer to the next page containing tag record array elements. If this pointer value is NULL, it means that the page contains the last element of the tag record array.

In some examples a tag record 402 may comprise: (1) a Start of Record field which includes a sequence of bytes that indicate the start of a tag record; (2) a Number of Entries field which includes a number of <Address, Length> entries to follow in the following fields; (3) a number of address and length entries (A1, Len1, . . . Ak, Lenk), where the Address field corresponds to the start address of a memory region (i.e., a command or data referenced by command) that must be included in the tag computation and the length corresponds to the length of the memory region; (4) an integrity tag field that include an integrity tag which is computed over all the memory regions specified in section (3); and (5) an end-of-record field that includes a sequence of bytes indicating the end of the tag record.

For example, the command 412 illustrated in FIG. 4 comprises an Operation Code (OpCode) and a sequence of parameters (pl, . . . pk, . . . pm). Some of the parameters may comprise inline values contained in the command itself, while other parameters (e.g., pk) point to values not contained in the command. Parameter k's value is a memory address that is the start of a memory buffer 414 referenced by the command (e.g., interface descriptor of the MEDIA_INTERFACE_DESCRIPTOR_LOAD command, as described earlier).

In some examples, a single integrity tag for command 412 may be computed over the following sequence of bytes:
(1) <A2, A2+len1−1>: The bytes in the command. A2 is the address of the command.
(2) <Ak, Ak+len2−1>: The bytes in the memory region indirectly referenced by the kth parameter of the command (address=Ak). Ak is the start address of the memory region referenced by the kth parameter.

In some examples an anti-replay counter is concatenated to the end of the sequence of bytes specified in the tag record before the end-of-record field. In one embodiment the anti-replay counter value is a monotonically increasing counter maintained independently by both the producer of the command buffer (i.e., user space software executing in the TEE of the host) and its consumer. The counter starts at a known initial value (e.g., zero) and the counter is incremented for every new tag computed by the producer and also incremented for every tag verified by the consumer on its side. This prevents an adversary from replaying old tags or dropping commands inside the command buffer.

However, even with the anti-replay counter, the adversary can drop the last n commands from the command buffer without detection if the above scheme for computing the tags is used, since the tags are computed independently for each command and do not capture the total number of commands in the command buffer. To mitigate this threat, in some examples the tag of the last command in the command buffer is calculated differently: an extra value (i.e., a command sequence number) is prepended to the sequence of bytes used to otherwise compute the tag. So, for example, if a command buffer has n commands, the data used to compute the last tag will start with n, the sequence number of the last command, followed by sequence of bytes specified in the tag record and the anti-replay counter value. This ensures that dropping of commands from the end of the command buffer will be detected by the verifier (i.e., the command processor).

Algorithm for Integrity Protected Command Buffer Execution

Having described various aspects of a computing environment adaptable for integrity protected command buffer execution, various operations which may be implemented to provide integrity protected command buffer execution will be described with reference to FIGS. 5-6. In some examples, the operations depicted in FIGS. 5-6 may be implemented by a processing device in a computing environment 100.

Figure 5:
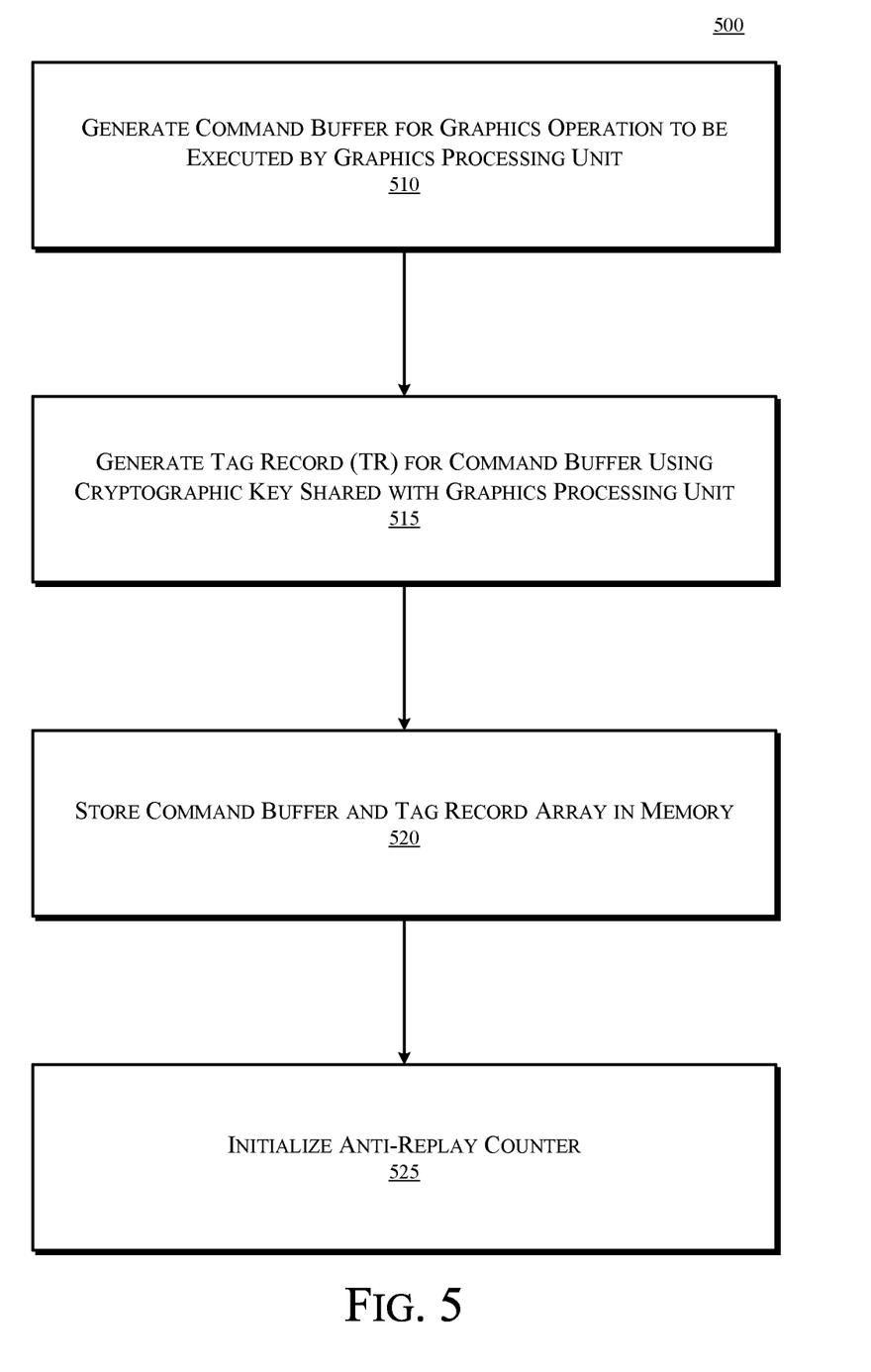
FIG. 5 is flowchart illustrating high-level operations to setup the data structures necessary to provide integrity-protected command buffer execution in accordance with an embodiment.

FIG. 5 is flowchart illustrating high-level operations to setup the data structures necessary to provide integrity-protected command buffer execution in accordance with an embodiment In some examples the operations depicted in FIG. 5 may be implemented by a processor in host 110, e.g., a processor in a trusted execution environment of host 110. Referring to FIG. 5, at operation 510 a command buffer is generated for a graphics operation to be implemented by a graphics processing device such as graphics processor 150. In some examples the command buffer comprises a ring buffer comprising a base command and at least a first level batch buffer linked to the ring buffer by a pointer and comprising one or more commands that execute in association with the base command.

At operation 515 a tag record (TRA) 400 are generated for the command buffer using a cryptographic key that is shared with the graphics processor. In some examples the cryptographic key may be a symmetric key that is used in the calculation of the integrity tags. In some examples the tag records in the array comprises one or more address fields identifying a start address for a command in a buffer and a length of the command located at the start address, and an integrity tag generated using the cryptographic key shared with the graphics processing unit, the command, data in the address fields referenced by the command, and the anti-replay counter. Thus, the value of the integrity key is a hash calculated over the command, the command data, and the anti-replay counter.

At operation 520 the command buffer and the tag record array are stored in host memory, and at operation 525 the anti-replay counter is initialized.

Figure 6:
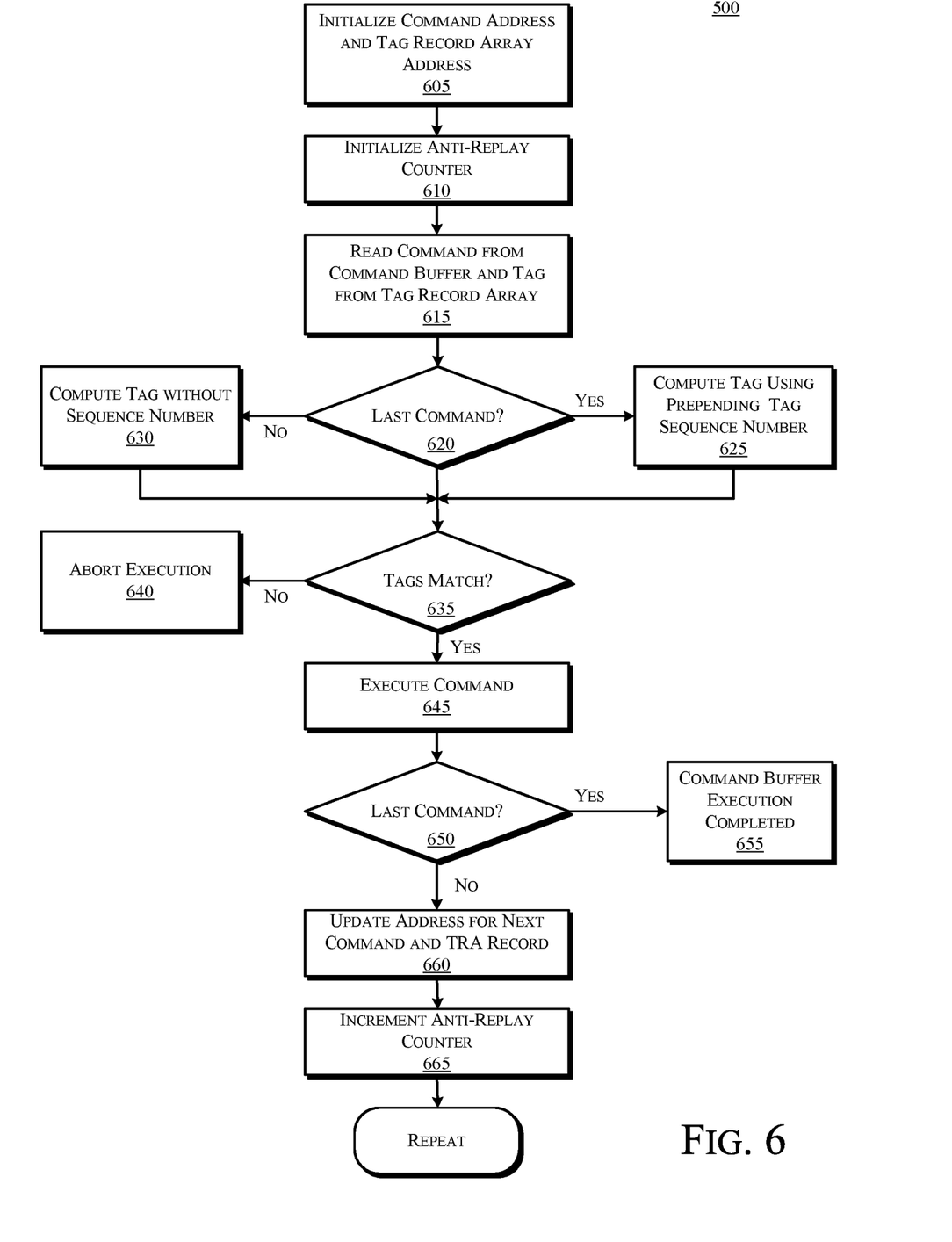
FIG. 6 is flowchart illustrating operations in a method to provide integrity-protected command buffer execution in accordance with an embodiment.

FIG. 6 is flowchart illustrating operations in a method to provide integrity-protected command buffer execution in accordance with an embodiment. In some examples the operations depicted in FIG. 6 may be implemented by one or more command processors in the graphics processor 150. Referring to FIG. 6, at operation 605 the command address and tag record array are initialized. At operation 601 the anti-replay counter is initialized, e.g., to zero. At operation 615 a command is read from the command buffer and the associated tag record 402 is read from the tag record array 400.

If, at operation 620, the command read in operation 615 is the last command in the command buffer then control passes to operation 625 and an integrity tag is calculated using the cryptographic key shared with the graphics processing unit, the command, data in the address fields referenced by the command, and the tag sequence number that is prepended to the last command in the command buffer, as described above with reference to FIG. 4. Thus, the value of the integrity key calculated in operation 625 is a hash calculated over the command, the command data, the anti-replay counter, and the prepended value.

By contrast, if at operation 620 the command read in operation 615 is not the last command in the command buffer then control passes to operation 630 and an integrity tag is calculated using the cryptographic key shared with the graphics processing unit, the command, data in the address fields referenced by the command, and the tag sequence number that is prepended to the last command in the command buffer, as described above with reference to FIG. 4. Thus, the value of the integrity key calculated in operation 630 is a hash calculated over the command, the command data, and the anti-replay counter.

At operation 635 it is determined whether the integrity tag calculated by the graphics processor 150 in operation 615 matches the integrity tag calculated by the host 110 in operation 515. In some examples the graphics processor 150 may compare the integrity tags to make this determination. If, at operation 635 the integrity tags do not match then it can be inferred that the command buffer has been corrupted, possibly as a result of an attack by a malicious actor. In that case control passes to operation 640 and execution of the command is aborted. In some examples the graphics processor may generate a signal to inform the host 110 that the command was aborted. By contrast, if at operation 635 match then in can be inferred that the command buffer has not been corrupted. In that case control passes to operation 645 and the graphics processor 150 executes the command in accordance with normal processing procedures.

At operation 650 it is determined whether the command executed in operation 645 was the last command in the command buffer. If, at operation 650, it is determined that the command was the last command then control passes to operation 655 and the command buffer execution is completed. By contrast, if at operation 650 it is determined that the command was not the last command then control passes to operation 660 and the memory addresses for the next command in the command buffer 200 and the next tag record in the tag record array 400 are updated. At operation 665 the anti-replay counter is incremented and control then passes back to operation 605 to repeat the operations in FIG. 6.

Exemplary Computing Architecture

Figure 7:
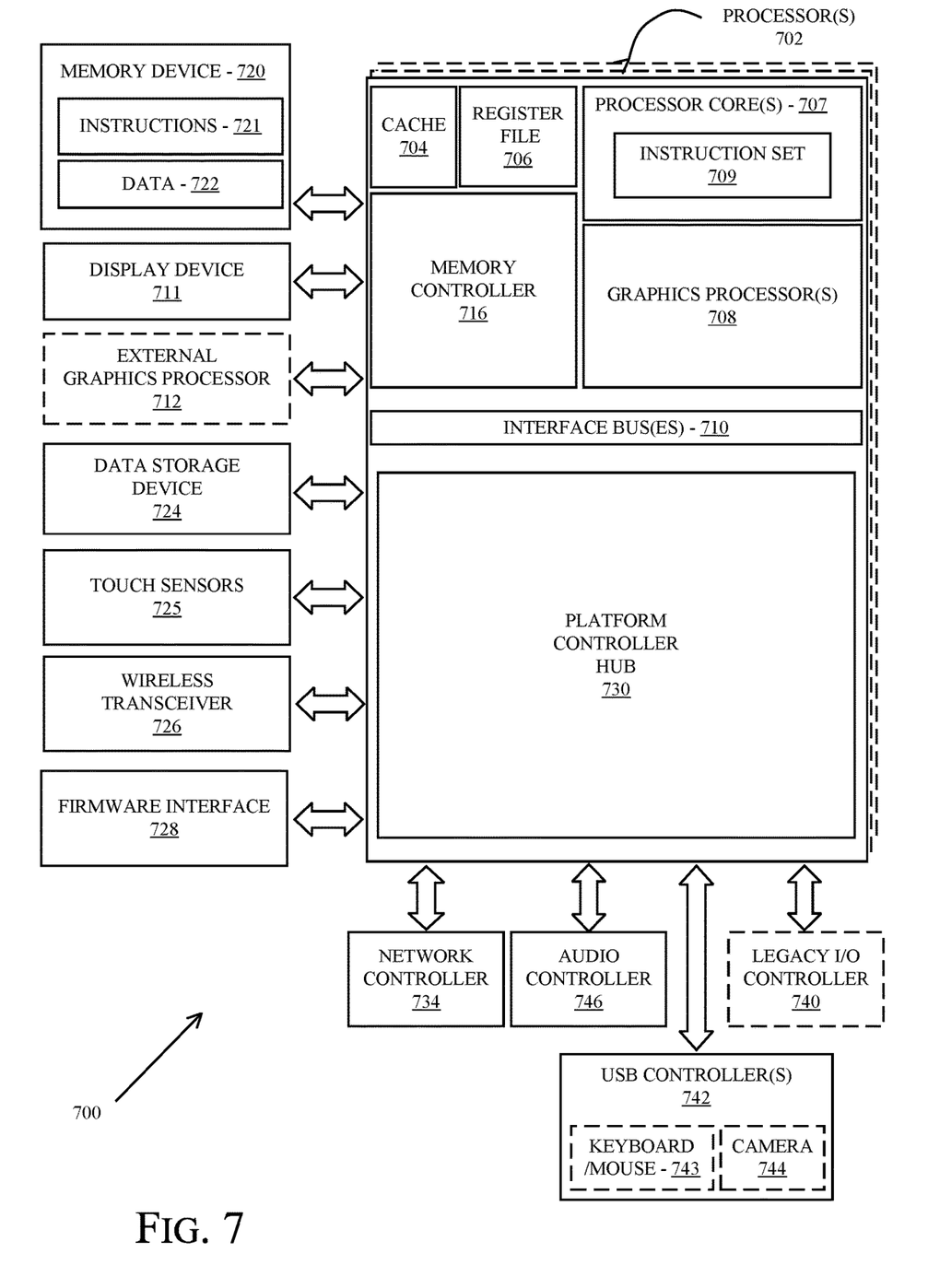
FIG. 7 is a block diagram illustrating a computing architecture which may be adapted to provide secure address translation services using message authentication codes and invalidation tracking in accordance with an embodiment.

FIG. 7 is a block diagram illustrating a computing architecture which may be adapted to implement a secure address translation service using a permission table (e.g., HPT 135 or HPT 260) and based on a context of a requesting device in accordance with some examples. The embodiments may include a computing architecture supporting one or more of (i) verification of access permissions for a translated request prior to allowing a memory operation to proceed; (ii) prefetching of page permission entries of an HPT responsive to a translation request; and (iii) facilitating dynamic building of the HPT page permissions by system software as described above.

In various embodiments, the computing architecture 700 may comprise or be implemented as part of an electronic device. In some embodiments, the computing architecture 700 may be representative, for example, of a computer system that implements one or more components of the operating environments described above. In some embodiments, computing architecture 700 may be representative of one or more portions or components in support of a secure address translation service that implements one or more techniques described herein.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive or solid state drive (SSD), multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the unidirectional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 714. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor buses are not limited to the DMI bus, and may include one or more Peripheral Component Interconnect buses (e.g., PCI, PCI Express), memory buses, or other types of interface buses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 execute an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, Long Term Evolution (LTE), or 5G transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel high definition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus comprising a computer-readable memory comprising one or more command buffers and a processing device communicatively coupled to the computer-readable memory to read, from a command buffer of the computer-readable memory, a first command received from a host device, the first command executable by one or more processing elements on the processing device, the first command comprising an instruction and associated parameter data; compute a first authentication tag using a cryptographic key associated with the host device, the instruction and at least a portion of the parameter data; and authenticate the first command by comparing the first authentication tag with a second authentication tag computed by the host device and associated with the command.

Example 2 includes the subject matter of Example 1, wherein the processing device is to initialize an anti-replay counter prior to reading the first command from the command buffer.

Example 3 includes the subject matter of Examples 1-2, wherein the processing device is to compute the first authentication tag using at least a portion of the anti-replay counter.

Example 4 includes the subject matter of Examples 1-3, wherein the processing device is to execute the first command when the first authentication tag matches the second authentication tag.

Example 5 includes the subject matter of Examples 1-4, wherein the processing device is to increment the anti-replay counter after the first command is executed.

Example 6 includes the subject matter of Examples 1-4, wherein the processing device is to abort execution of the first command when the first authentication tag does not match the second authentication tag.

Example 7 includes the subject matter of Example 6 wherein the processing device is to read, from the command buffer of the computer-readable memory, a second command received from the host device, the second command executable by one or more processing elements on the processing device, the second command comprising an instruction and associated parameter data; compute a second authentication tag using a cryptographic key associated with the host device, the instruction and at least a portion of the parameter data; and authenticate the second command by comparing the first authentication tag with a second authentication tag computed by the host device and associated with the command.

Example 8 includes a computer-implemented method, comprising reading, from a command buffer of a computer-readable memory, a first command received from a host device, the first command executable by one or more processing elements on the processing device, the first command comprising an instruction and associated parameter data; computing a first authentication tag using a cryptographic key associated with the host device, the instruction and at least a portion of the parameter data; and authenticating the first command by comparing the first authentication tag with a second authentication tag computed by the host device and associated with the command.

Example 9 includes the subject matter of Example 8, further comprising initializing an anti-replay counter prior to reading the first command from the command buffer.

Example 10 includes the subject matter of Examples 8-9 further comprising computing the first authentication tag using at least a portion of the anti-replay counter.

Example 11 includes the subject matter of Examples 8-10, further comprising executing the first command when the first authentication tag matches the second authentication tag.

Example 12 includes the subject matter of Examples 8-11, further comprising incrementing the anti-replay counter after the first command is executed.

Example 13 includes the subject matter of Examples 8-12, further comprising aborting execution of the first command when the first authentication tag does not match the second authentication tag.

Example 14 includes the subject matter of Example 8-13, further comprising reading, from the command buffer of the computer-readable memory, a second command received from the host device, the second command executable by one or more processing elements on the processing device, the second command comprising an instruction and associated parameter data; computing a second authentication tag using a cryptographic key associated with the host device, the instruction and at least a portion of the parameter data; and authenticating the second command by comparing the first authentication tag with a second authentication tag computed by the host device and associated with the command.

Example 15 includes one or more non-transitory computer-readable storage mediums having stored thereon executable computer program instructions that, when executed by one or more processors, cause the one or more processors to read, from a command buffer of a computer-readable memory, a first command received from a host device, the first command executable by one or more processing elements on the processing device, the first command comprising an instruction and associated parameter data; compute a first authentication tag using a cryptographic key associated with the host device, the instruction and at least a portion of the parameter data; and authenticate the first command by comparing the first authentication tag with a second authentication tag computed by the host device and associated with the command.

Example 16 includes the subject matter of Example 15, further comprising instructions which, when executed by the processor, configure the processor to initialize an anti-replay counter prior to reading the first command from the command buffer.

Example 17 includes the subject matter of Examples 15-16, further comprising instructions which, when executed by the processor, configure the processor to compute the first authentication tag using at least a portion of the anti-replay counter.

Example 18 includes the subject matter of Examples 15-18, further comprising instructions which, when executed by the processor, configure the processor to execute the first command when the first authentication tag matches the second authentication tag Example 19 includes the subject matter of Examples 15-17, further comprising instructions which, when executed by the processor, configure the processor to increment the anti-replay counter after the first command is executed.

Example 20 includes the subject matter of Examples 15-19, further comprising instructions which, when executed by the processor, configure the processor to abort execution of the first command when the first authentication tag does not match the second authentication tag.

Example 21 includes the subject matter of Examples 15-19, further comprising instructions which, when executed by the processor, configure the processor to read, from the command buffer of the computer-readable memory, a second command received from the host device, the second command executable by one or more processing elements on the processing device, the second command comprising an instruction and associated parameter data; compute a second authentication tag using a cryptographic key associated with the host device, the instruction and at least a portion of the parameter data; and authenticate the second command by comparing the first authentication tag with a second authentication tag computed by the host device and associated with the command.

Example 22 includes a computer-implemented method, comprising generating, in a processing device, a command buffer for a graphics operation to be executed by a graphics processing unit communicatively coupled to the apparatus; generating, in the processing device, a tag record array for the command buffer using a cryptographic key shared with the graphics processing unit; and storing the command buffer and the tag record array in a memory communicatively couple to the apparatus.

Example 23 includes the subject matter of Example 22, wherein the command buffer comprises a ring buffer comprising a base command; and at least a first batch buffer linked to the ring buffer by a first pointer and comprising one or more commands that execute in association with the base command.

Example 24 includes the subject matter of Examples 21-23, wherein the tag record array comprises one or more address fields identifying a start address for a command in a buffer and a length of the command located at the start address; and an authentication tag generated using the cryptographic key shared with the graphics processing unit and data in the one or more address fields.

Example 25 includes a computer-implemented method, comprising generating, in a processing device, a command buffer for a graphics operation to be executed by a graphics processing unit communicatively coupled to the apparatus; generating, in the processing device, a tag record array for the command buffer using a cryptographic key shared with the graphics processing unit; and storing the command buffer and the tag record array in a memory communicatively couple to the apparatus.

Example 26 includes the subject matter of Example 25, wherein the command buffer comprises a ring buffer comprising a base command; and at least a first batch buffer linked to the ring buffer by a first pointer and comprising one or more commands that execute in association with the base command.

Example 27 includes the subject matter of Examples 25-26, wherein the tag record array comprises one or more address fields identifying a start address for a command in a buffer and a length of the command located at the start address; and an authentication tag generated using the cryptographic key shared with the graphics processing unit and data in the one or more address fields.

Example 28 includes a non-transitory computer readable medium comprising instructions which, when executed by a processor, configure the processor to generate, in a processing device, a command buffer for a graphics operation to be executed by a graphics processing unit communicatively coupled to the apparatus; generate, in the processing device, a tag record array for the command buffer using a cryptographic key shared with the graphics processing unit; and store the command buffer and the tag record array in a memory communicatively couple to the apparatus, Example 29 includes the subject matter of Example 28, wherein the command buffer comprises a ring buffer comprising a base command; and at least a first batch buffer linked to the ring buffer by a first pointer and comprising one or more commands that execute in association with the base command.

Example 30 includes the subject matter of Examples 28-29, wherein the tag record array comprises one or more address fields identifying a start address for a command in a buffer and a length of the command located at the start address; and an authentication tag generated using the cryptographic key shared with the graphics processing unit and data in the one or more address fields In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

What is claimed is:

1. An apparatus, comprising:
   a computer-readable memory comprising one or more command buffers, the one or more command buffers comprising a ring buffer to store a first command and one or more batch buffer store additional commands related to the first command, wherein the additional commands are linked by pointers to enable sequential execution; and
   a processing device communicatively coupled to the computer-readable memory to:
      read, from a command buffer of the computer-readable memory, a first command received from a host device, the first command executable by one or more processing elements on the processing device, the first command comprising an instruction and associated parameter data including an address of a memory region referenced by the first command and comprising first command data to be operated on by execution of the first command;
      compute a first authentication tag using a cryptographic key associated with the host device, the instruction and the first command data residing at the address of a memory region referenced by the first command; and
      authenticate the first command by comparing the first authentication tag with a second authentication tag computed by the host device and associated with the command.

2. The apparatus of claim 1, wherein the processing device is to:
   initialize an anti-replay counter prior to reading the first command from the command buffer.

3. The apparatus of claim 2, wherein the processing device is to:
   compute the first authentication tag using at least a portion of the anti-replay counter.

4. The apparatus of claim 2, wherein the processing device is to:
   execute the first command when the first authentication tag matches the second authentication tag.

5. The apparatus of claim 4, wherein the processing device is to:
   increment the anti-replay counter after the first command is executed.

6. The apparatus of claim 1, wherein processing device is to:
   abort execution of the first command when the first authentication tag does not match the second authentication tag.

7. The apparatus of claim 1, wherein the processing device is to:
   read, from the command buffer of the computer-readable memory a second command received from the host device, the second command executable by one or more processing elements on the processing device, the second command comprising an instruction and associated parameter data including an address of a memory region referenced by the second command and comprising second command data to be operated on by execution of the second command;
   compute a second authentication tag using a cryptographic key associated with the host device, the instruction and at least a portion of the parameter data including the second command data residing at the address of a memory region referenced by the first second command; and
   authenticate the second command by comparing the first authentication tag with a second authentication tag computed by the host device and associated with the command.

8. A computer-implemented method, comprising:
   reading, from a command buffer of the computer-readable memory, the one or more command buffers comprising a ring buffer to store a first command and one or more batch buffer store additional commands related to the first command, wherein the additional commands are linked by pointers to enable sequential execution, a first command received from a host device, the first command executable by one or more processing elements on the processing device, the first command comprising an instruction and associated parameter data including an address of a memory region referenced by the first command and comprising first command data to be operated on by execution of the first command;

computing a first authentication tag using a cryptographic key associated with the host device, the instruction and at least a portion of the parameter data including the first command data residing at the address of a memory region referenced by the first command; and authenticating the first command by comparing the first authentication tag with a second authentication tag computed by the host device and associated with the command.

9. The method of claim 8, further comprising:
initializing an anti-replay counter prior to reading the first command from the command buffer.

10. The method of claim 9, further comprising:
compute the first authentication tag using at least a portion of the anti-replay counter.

11. The method of claim 9, further comprising:
execute the first command when the first authentication tag matches the second authentication tag.

12. The method of claim 11, further comprising:
incrementing the anti-replay counter after the first command is executed.

13. The method of claim 8, further comprising:
aborting execution of the first command when the first authentication tag does not match the second authentication tag.

14. The method of claim 8, further comprising:
reading, from the command buffer of the computer-readable memory, a second command received from the host device, the second command executable by one or more processing elements on the processing device, the second command comprising an instruction and associated parameter data including an address of a memory region referenced by the second command and comprising second command data to be operated on by execution of the second command;

computing a second authentication tag using a cryptographic key associated with the host device, the instruction and at least a portion of the parameter data including the second command data residing at the address of a memory region referenced by the first second command; and authenticating the second command by comparing the first authentication tag with a second authentication tag computed by the host device and associated with the command.

15. A non-transitory computer readable medium comprising instructions which, when executed by a processor, configure the processor to:

read, from a command buffer of the computer-readable memory, the one or more command buffers comprising a ring buffer to store a first command and one or more batch buffer store additional commands related to the first command, wherein the additional commands are linked by pointers to enable sequential execution, a first command received from a host device, the first command executable by one or more processing elements on the processing device, the first command comprising an instruction and associated parameter data including an address of a memory region referenced by the first command and comprising first command data to be operated on by execution of the first command;

compute a first authentication tag using a cryptographic key associated with the host device, the instruction and at least a portion of the parameter data including the first command data residing at the address of a memory region referenced by the first command; and authenticate the first command by comparing the first authentication tag with a second authentication tag computed by the host device and associated with the command.

16. The non-transitory computer readable medium of claim 15, further comprising instructions which, when executed by the processor, configure the processor to:
initialize an anti-replay counter prior to reading the first command from the command buffer.

17. The non-transitory computer readable medium of claim 16, further comprising instructions which, when executed by the processor, configure the processor to:
compute the first authentication tag using at least a portion of the anti-replay counter.

18. The non-transitory computer readable medium of claim 16, further comprising instructions which, when executed by the processor, configure the processor to:
execute the first command when the first authentication tag matches the second authentication tag.

19. The non-transitory computer readable medium of claim 18, further comprising instructions which, when executed by the processor, configure the processor to:
increment the anti-replay counter after the first command is executed.

20. The non-transitory computer readable medium of claim 15, further comprising instructions which, when executed by the processor, configure the processor to:
abort execution of the first command when the first authentication tag does not match the second authentication tag.

21. The non-transitory computer readable medium of claim 15, further comprising instructions which, when executed by the processor, configure the processor to:

read, from the command buffer of the computer-readable memory, a second command received from the host device, the second command executable by one or more processing elements on the processing device, the second command comprising an instruction and associated parameter data including an address of a memory region referenced by the second command and comprising second command data to be operated on by execution of the second command;

compute a second authentication tag using a cryptographic key associated with the host device, the instruction and at least a portion of the parameter data including the second command data residing at the address of a memory region referenced by the first second command; and authenticate the second command by comparing the first authentication tag with a second authentication tag computed by the host device and associated with the command.

22. An apparatus, comprising:
a computer-readable memory comprising one or more command buffers, the one or more command buffers comprising a ring buffer to store a first command and one or more batch buffer store additional commands related to the first command, wherein the additional commands are linked by pointers to enable sequential execution; and a processing device communicatively coupled to the computer-readable memory to:
generate a command buffer for a graphics operation to be executed by a graphics processing unit communicatively coupled to the apparatus;

generate a tag record array for the command buffer using a cryptographic key shared with the graphics processing unit, an instruction associated with the graphics operation and an address of a memory region referenced by the instruction, one or more address fields identifying a start address for a command in a buffer and a length of the command located at the start address, and an authentication tag generated using the cryptographic key shared with the graphics processing unit and command data residing in the one or more address fields; and store the command buffer and the tag record array in a memory communicatively couple to the apparatus.

23. The apparatus of claim 22, wherein the command buffer comprises:

a ring buffer comprising a base command; and at least a first batch buffer linked to the ring buffer by a first pointer and comprising one or more commands that execute in association with the base command.

\* \* \* \* \*